Dec. 24, 1940.  W. S. WEST  2,225,674
PRESSURE INDICATOR FOR PNEUMATIC TIRES
Filed May 20, 1938
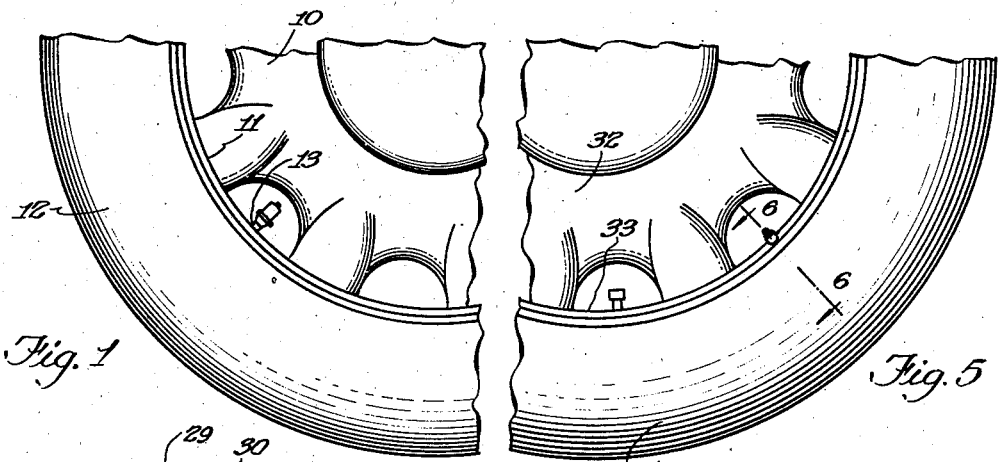
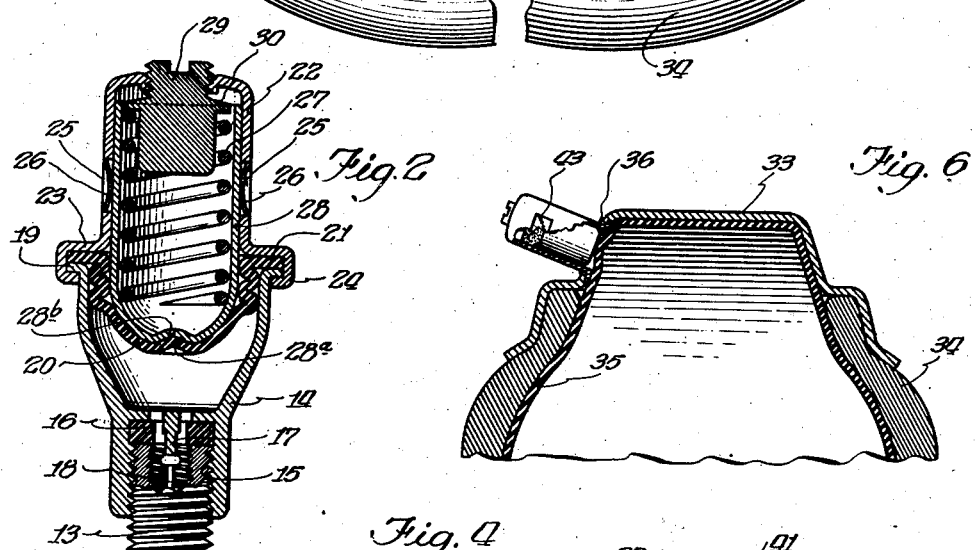
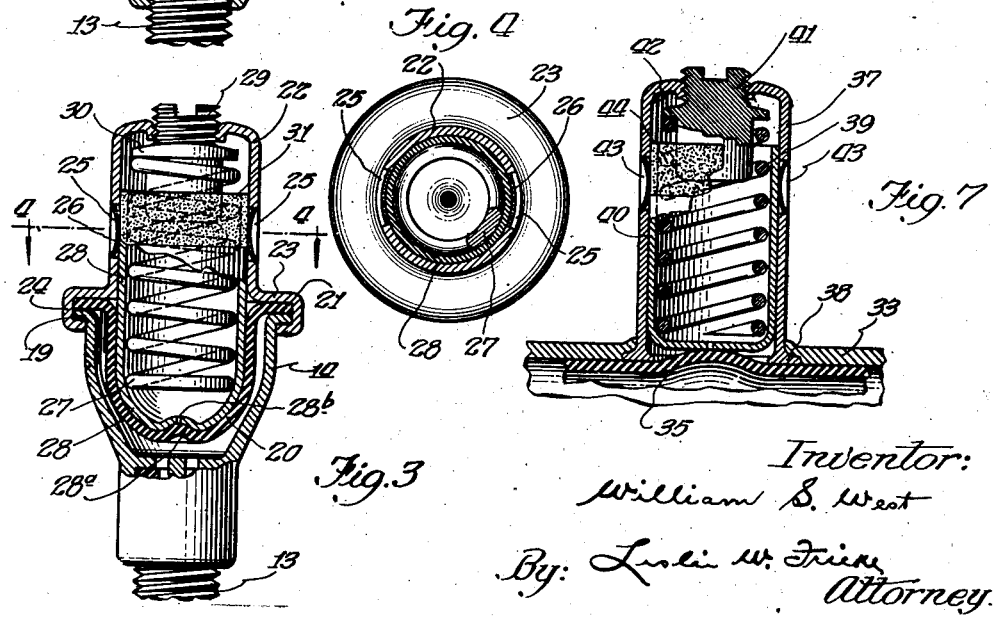
Inventor:
William S. West
By: Leslie W. Frier
Attorney Patented Dec. 24, 1940

2,225,674

UNITED STATES PATENT OFFICE 2,225,674

PRESSURE INDICATOR FOR PNEUMATIC TIRES

William S. West, Chicago, Ill.

Application May 20, 1938, Serial No. 209,035

4 Claims. (Cl. 116—34)

My invention relates to pressure indicators for pneumatic tires, and it has for its object the provision of a new and improved form and arrangement of parts in a device of this type whereby a driver of a motor vehicle having one of my improved indicators on each of the tires can by a glance at the several indicators determine quickly and easily whether pressure in the tires is normal or on the other hand is abnormally low. Inasmuch as it is highly important that the air pressure in the tires of a motor vehicle be kept comparatively close to normal at all times so as to protect against damage to the tires by reason of low pressure conditions, it has been an object of my invention to provide a construction and arrangement by which a check on the pressure in a tire can be made with a minimum of effort.

To this end, it is one of the objects of my invention to provide an improved device of the type specified adapted to be left in position on the valve stem in place of the ordinary cap and arranged so that it registers at all times the pressure in the tire in such manner that at least the general condition of the pressure can be ascertained at a glance without the necessity for manual manipulation of any of the parts and preferably without even the necessity for close examination of the device.

It is one of the objects of my invention to provide a device of this type which shall be of little weight so as to have a minimum effect of throwing the wheel out of balanced condition when applied in place of the usual light cap, and which shall be of such small size as to be capable of being turned readily about its longitudinal axis for application to the threads of the valve stem of the tire. It is a further object of my invention to provide a device of this type of such simple construction and light weight as to enable me to produce the parts and to assemble the construction on a commercial scale at comparatively low cost.

It is another object of my invention to provide an improved and simplified arrangement wherein the indicating means bears directly against the outside of the inner tube of a tire and is responsive to and indicates the pressure of the air within the tube.

In its preferred form, my invention contemplates yielding means preferably in the form of a coiled spring which bears against a flexible imperforate member and which in turn is responsive to the pressure of the air in the inner tube; and, it is a further object of my invention to provide adjustable means for varying the action of said yielding means so that the indicator will be in a certain position with respect to the sight opening of the device when the air in the tire is at a predetermined pressure and whereby the indicator moves to a different position with respect to the sight opening when the air pressure in the tire drops below said predetermined amount.

The invention consists in the novel constructions, arrangements and devices to be hereinafter described and claimed for carrying out the above stated objects and such other objects as will appear from the following specification. The invention is illustrated in certain preferred embodiments in the accompanying drawing, wherein—

Fig. 1 is a side face view of a portion of an automobile wheel and tire in position thereon, my improved device being mounted on the valve stem of the tire;

Fig. 2 is a central vertical section on an enlarged scale through my improved device;

Fig. 3 is a view similar to Fig. 2 but showing a changed position of the parts;

Fig. 4 is a horizontal sectional view taken on the line 4—4 of Fig. 3;

Fig. 5 is a side face view of a portion of an automobile wheel and tire in position thereon equipped with a modified form of pressure indicator embodying the principles of my invention;

Fig. 6 is a sectional view on an enlarged scale taken on the line 6—6 of Fig. 5; and Fig. 7 is a central vertical section, on a still greater scale, of the indicator shown in Figs. 5 and 6.

Like characters of reference designate like parts in the several views.

Referring first to Figs. 1 to 4 of the drawing, a disc wheel of any approved type is shown at 10 provided with a rim 11 on which is mounted a pneumatic tire 12 equipped with the ordinary valve stem 13 extending inwardly through the rim 11.

As is best shown in Figs. 2 and 3, a housing member 14 in the form of a nipple of suitable material is placed on the outer end of the valve stem 13, being mounted in position through the medium of a screw-threaded socket portion 15 provided with a suitable gasket 16 at its inner end. The housing member 14 is provided with a pin 17 extending longitudinally of the socket in position to engage the shank of the tire valve 18 so as to unseat the tire valve when the housing member is screwed into operative position on the valve stem. At its opposite end, the housing member 14 is provided with an outwardly extending flange or rim 19. A flexible imperforate sack-like member 20 is positioned within the housing member 14, its upper end terminating in an outwardly extending rim portion 21 which is placed over the rim 19 of the housing member.

An upper housing member 22 preferably drawn out of suitable metal is provided at its lower end with an outwardly extending rim portion 23 which rests upon the rim 21. The housing members 14 and 22 may be secured together in any preferred manner, as by spinning the lower end or marginal portion 24 of the upper member around underneath the rim portion 19 of the lower member in which operation the rim portion 21 of the imperforate member is securely clamped between the housing portions 19 and 23. The housing member 22 is provided with sight openings 25 preferably covered by transparent closure members 26 of celluloid, glass or the like which are sealed in the housing member by any suitable adhesive or cementitious material to prevent the entrance of dirt or moisture. Within the housing member 22, I have provided yielding means in the form of a stiff coiled spring 27 which is disposed within a sleeve-like seating member 28 which may be drawn out of any suitable metal, the lower end of the member 28 being adapted to project into the housing member 14 surrounded by the flexible and imperforate sack-like member 20. Preferably adjustable means in the form of a stud 29 having threaded connection with the top wall of the housing member 22 extends into the upper end of the spring 27, the member 29 being provided with a collar portion 30 which seats against the upper end of the spring. It will be apparent that the action of the spring can be varied by turning the member 29 with respect to the housing member 22, thereby making it unnecessary to calibrate the spring. The side walls of the seating member 28 extend upwardly beyond the sight openings 25, the upper end of said seating member being provided with indicating means in the form of a distinctively colored band 31 adapted to be seen in whole or in part through the sight openings.

As is apparent from Figs. 2 and 3, the flexible imperforate member 20 divides the housing into upper and lower chambers, the lower chamber being in communication with the inner tube of the tire when the valve stem is unseated in which case the air pressure in the lower chamber under the member 20 is the same as that within the tire. The strength of the spring 27 in relation to the opposing pressure of the air against the member 20 is such that when the pressure in the tire is normal the seating member 28 stands substantially as shown in Fig. 2 with the indicating band 31 thereon above the sight openings 25 and not visible therethrough. As will be readily appreciated, when the pressure in the tire becomes abnormally low the spring 27 forces its seating member 28 downwardly thus bringing the indicating band 31 into position to be seen in whole or in part through the sight openings 25, under such conditions the parts standing substantially in the position shown in Fig. 3.

The flexible imperforate member 20 may be made of any suitable material impervious to the passage of air and adapted to be crumpled or folded upon itself a great many times without damaging the material. I have found soft or flexible rubber molded into the proper shape to be satisfactory. The length of the sack-like member 20 preferably is such that it is not substantially stretched when the seating member 28 is in the position shown in Fig. 3. There is sufficient space between the seating member 28 and the inside wall of the housing member 14 to permit the member 20 to fold upon itself as shown in Fig. 2, when the pressure of the air against the lower side of the member 20 is sufficient to force the seating member 28 into a position substantially as shown in Fig. 2. The central portion of the lower end of the seating member 28 is pressed upwardly to provide a recessed portion 28a within which the central portion of the member 20 is forced by the pressure of the air, the recessed portion of the seating member being preferably vented at 28b to prevent the formation of an air pocket between the seating member and the imperforate member 20. The pressure of the air against the under side of the member 20 tends to hold its central portion firmly against the recessed portion of the seating member thereby insuring uniform folding of the member 20 at the sides of the seating member when the latter is moved upwardly. The member 20 has substantially no inherent resistance to movement. It provides a floating seal between the air in the lower chamber of the housing and the seating member and spring in its upper chamber. The device is very sensitive to changes in pressure conditions within the tire and provides an accurate means of determining quickly when the pressure drops below normal.

When it is necessary to inflate the tire, the device as a whole is removed so as to afford access to the valve stem in the usual manner. When the device is unscrewed to a slight extent from the valve stem the pin 17 is retracted sufficiently to permit the valve 18 again to seat in the usual manner so as to prevent the escape of air from the tire.

Referring now to the modified arrangement shown in Figs. 5 to 7, it will be seen that the disc wheel 32 is provided with a rim 33 of the drop-center type on which a pneumatic tire 34 is mounted, the tire being provided with the usual inner tube 35. The rim 33 is provided with an opening 36 in which the lower end of a housing member 37 is positioned. The member 37 may be secured to the rim 33 in any desired manner as by flanging over its lower end at 38 against the rim. A coiled spring 39 is positioned within the housing 37, the lower end of the spring being disposed within a sleeve-like seating member 40, the bottom of which bears against the outer side of the inner tube 35. An adjustable member in the form of a stud 41 has threaded engagement with the top wall of the housing 37 and is provided with a collar portion 42 adapted to bear on the upper end of the spring. The housing 37 is provided with sight openings 43 and the seating member 40 is provided with a distinctively colored band portion 44 which is visible in whole or in part through the sight openings 43.

The operation of the modified arrangement is substantially the same as that heretofore described in connection with the construction shown in Figs. 2 and 3. In the modified arrangement the stud 41 is adjusted so that when the pressure within the inner tube is at the desired amount the seating member 40 is in such position within its housing that the indicating band portion 44 thereon is just out of sight above the openings 43. As the pressure within the inner tube drops, the seating member moves downwardly thereby exposing the indicating means to view through the sight openings, the extent to which the pressure drops in the inner tube being shown by that portion of the indicating band which is visible through said sight openings.

By the use of my improved arrangements a driver is enabled quickly and easily to check the pressure condition of his tires without any manual manipulation of the parts. The devices are comparatively of small size and have little tendency to throw the wheels out of balance. The constructions are simple and can be readily and cheaply assembled.

While I have illustrated in detail and have specifically described certain preferred constructions, it is to be understood that such has been done merely for the purpose of illustrating the principles of the invention. I do not intend, therefore, to limit my invention to the details of construction shown and described except only in so far as certain of the appended claims are specifically so limited as it will be obvious that modifications may be made without departing from the principles of the invention.

I claim:

1. In an arrangement for indicating the air pressure in a pneumatic tire, the combination of a housing, flexible imperforate means sealed across the housing and dividing it into first and second chambers, the first chamber being adapted to be put into communication with the air chamber of a tire, the second chamber having a sight opening, yielding means in the second chamber, and a seating member in the second chamber under the influence of said yielding means and having an indicator, said seating member having a portion adapted to project into the first chamber surrounded by said flexible means, the flexible means being sack-like in form and adapted to fold upon itself around the projecting portion of the seating member when the latter is at the limit of its movement in one direction, the sack-like flexible means being of such length that it is not substantially stretched when unfolded by movement of the seating member to its limit in the opposite direction.

2. In an arrangement for indicating the air pressure in a pneumatic tire, the combination of a housing, flexible imperforate means sealed across the housing and dividing it into first and second chambers, the first chamber being adapted to be put into communication with the air chamber of a tire, the second chamber having a sight opening, yielding means in the second chamber, and a seating member in the second chamber under the influence of said yielding means and having an indicator, said seating member having a portion adapted to project into the first chamber surrounded by said flexible means, the end of the projecting portion of the seating member adjacent the flexible means being recessed to receive the central portion of the flexible means held therein by the pressure of the air in the first chamber, the flexible means being sack-like in form and adapted to fold upon itself around the projecting portion of the seating member when the latter is at the limit of its movement in one direction, the sack-like flexible means being of such length that it is not substantially stretched when unfolded by movement of the seating member to its limit in the opposite direction.

3. In an arrangement for indicating the air pressure in a pneumatic tire, the combination of a housing, flexible imperforate means sealed across the housing and dividing it into first and second chambers, the first chamber being adapted to be put into communication with the air chamber of a tire, the second chamber having a sight opening, yielding means in the second chamber, means for varying the action of said yielding means, and a seating member in the second chamber under the influence of said yielding means and having an indicator, said seating member having a portion adapted to project into the first chamber surrounded by said flexible means, the flexible means being sack-like in form and adapted to fold upon itself around the projecting portion of the seating member when the latter is at the limit of its movement in one direction, the sack-like flexible means being of such length that it is not substantially stretched when unfolded by movement of the seating member to its limit in the opposite direction.

4. In an arrangement for indicating the air pressure in a pneumatic tire, the combination of a housing, flexible imperforate means sealed across the housing and dividing it into first and second chambers, the first chamber being adapted to be put into communication with the air chamber of a tire, the second chamber having a sight opening, a spring in the second chamber, a seating member in the second chamber under the influence of said spring and having an indicator, and an adjustable member on the housing and bearing against said spring for varying its action, said seating member having a portion adapted to project into the first chamber surrounded by said flexible means, the flexible means being sack-like in form and adapted to fold upon itself around the projecting portion of the seating member when the latter is at the limit of its movement in one direction, the sack-like flexible means being of such length that it is not substantially stretched when unfolded by movement of the seating member to its limit in the opposite direction.

WILLIAM S. WEST.